United States Patent [19]

Kaari

[11] Patent Number: 5,014,837
[45] Date of Patent: May 14, 1991

[54] IMPULSE TORQUE CONVERTER

[76] Inventor: Kauko Kaari, Koroistentie 6 a, SF-00280 Helsinki, Finland

[21] Appl. No.: 209,489

[22] Filed: Jun. 21, 1988

[30] Foreign Application Priority Data

Feb. 15, 1988 [GB] United Kingdom ............... 8803412

[51] Int. Cl.$^5$ .................. F16D 31/04; F16D 31/06
[52] U.S. Cl. .................. 192/61; 192/12 B; 192/58 R; 464/57
[58] Field of Search ............ 192/61, 59, 58 R, 12 B; 464/57; 60/435; 418/65, 187

[56] References Cited

U.S. PATENT DOCUMENTS

| | | | |
|---|---|---|---|
| 1,590,834 | 6/1926 | King | 464/57 |
| 1,662,223 | 3/1928 | Werner et al. | 464/57 |
| 3,838,574 | 10/1974 | Gelders | 192/61 X |
| 4,078,453 | 3/1978 | Brace | 192/61 X |
| 4,564,095 | 1/1986 | Lackey | 192/59 |
| 4,674,615 | 6/1987 | Snyder | 192/61 |

Primary Examiner—Rodney H. Bonck
Attorney, Agent, or Firm—Bachman & LaPointe

[57] ABSTRACT

Procedure and device for converting the torque acting on the shaft when energy quanti are transferred from the input shaft, driven by the engine, to the output shaft, driving the load, in the form of impulses the number of which in time unit is proportional to the difference between the revolution speeds of the input shaft and the output shaft. The input shaft, driven by the engine, disengages itself repeatedly from the middle shaft, when the motional speed of the moving parts of the engine and the quantity of the motional energy based on it grows, which growth of the motional energy will be converted as impulses into potential energy, which in form of the torsional force of the spring, located between the middle shaft and the output shaft, maintains on the output shaft a torque required by the loading.

12 Claims, 3 Drawing Sheets

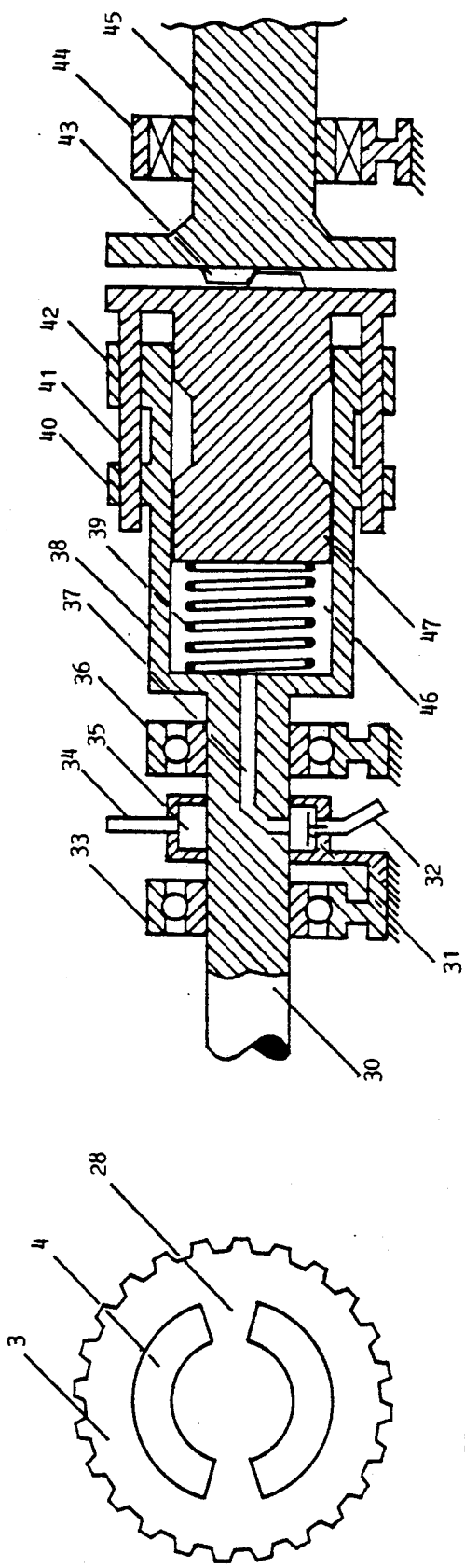
FIG. 3.
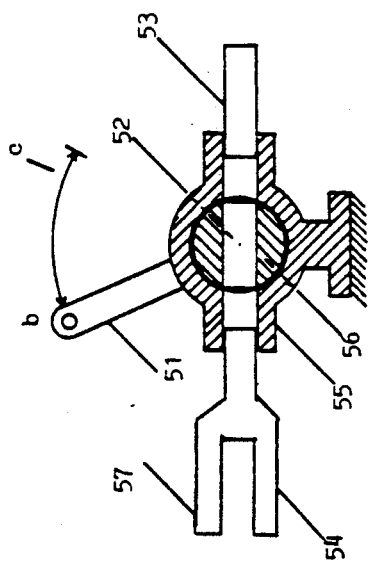
FIG. 4.
FIG. 2.

IMPULSE TORQUE CONVERTER

BACKGROUND OF THE INVENTION

When using an internal combustion engine as a source of power in vehicles, earth moving machines, etc., the power transmission has a central significance in practical conditions. The adaptation of the revolution speed of the engine and the cardan axle to each other so that on the cardan axle acts the torque required by the loading in the different driving situations requires the use of a transmission functioning at several gearing ratios. The different gearing ratios are obtained most usually by means of gear wheels. When the average driving speed in the European automobile traffic is estimated at 18.5 km/h, it means frequently repeated stops and shifting to different gears as well as plentiful driving at low gears and light engine loading. In these conditions, the fuel economy of the combustion engine is really poor and the power transmission losses are maximum, calculated in percentages. A decisive improvement would thus require the development of a transmission functioning in a wide gearing ratio range and steplessly, when the torque converting ratio can be changed in a smooth way according to the driving situations.

SUMMARY OF THE INVENTION

The solution according to the invention fulfills these requirements and the physical foundation of its function is the conversion of the motional energy quanta by means of the impulses into potential energy. The motional energy quanta are formed when the engine, driving the transmission, functions for a moment unloaded and the speed of its moving parts, as well as the quantity of motional energy based on it, grows. When the input shaft, driven by the engine, gets thereafter engaged to the middle shaft, the angle speed of this rises and becomes nearly equal to that of the input shaft and greater than the angle speed of the output shaft, which increases the torsional force of the spring located between the middle shaft and the output shaft. Thereafter the connection of the input shaft and the middle shaft gets disengaged and the same process begins from the beginning again. In this way, the increase of the motional energy quantity is converted by means of an impulse into torsional force, i.e. an increase of the quantity of potential energy and maintains on the output shaft acting torque, which depends on the loading and may be for instance about 10-fold as compared to the average torque generated by the engine. A mechanical condition of the functioning of the solution according to the invention is a hydrostatic clutch located between the input shaft and the middle shaft by means of which the engagement of the input shaft to the middle shaft and its disengagement from it can take place rapidly enough without mechanically straining secondary effects. This is quite possible among others with the help of the variations shown in FIGS. 1, 3 and 5 and can evidently be realized also with a magnetic clutch.

The profits of the solution according to the invention are the simple design as well as above all the technical properties such as the stepless function in a wide torque converting range. Moreover the solution selects automatically the conversion ratio required by the loading on the output shaft, wherefore the complete automatization of the functioning is easy. This is based, when the engine throttling is unchanged, on the fact that when the torque converting ratio is growing as a result of the harder loading on the output shaft the number of impulses, for a time unit, increases nearly in the same proportion but their duration time shortens correspondingly. Because of this, the quantity of energy transferred per time unit with the help of the clutch from the input shaft to the middle shaft and further to the output shaft will be nearly unchanged as well as the engine loading. Thus, if the position of the valves, which are controlling the function of the device are not changed, the loading variations on the output shaft will act upon the torque converting ratio and the revolution speed of the output shaft, but the influence upon the loading and the revolution speed of the engine is proportionally small. A complete automation is reached when the functioning of the control valves is synchronized with the variations of the engine performance and revolution speed as well as with the loading on the output shaft.

A noteworthy profit, as compared to conventional automatic transmissions, is among others the decisively better efficiency in the power transmission and also generally speaking a good efficiency at low converting ratio values due to the fact that there appear no gear wheel losses. On direct drive, the losses are insignificant and due, in the first place, to the oil viscosity. On the other hand, each impulse causes losses, the amount of which depends on the quantity of oil flowing during the impulse through the control valve and on the pressure difference. As, when the converting ratio is growing, the number of impulses per one revolution of the output shaft grows, the consequence of it is that the converting efficiency is determined as a function of the torque converting ratio according to the following formula:

$$n = 1 - \frac{CR - 1}{c}$$

where
n = efficiency
CR = torque converting ratio
c = coeffcient, depending on the construction The value of coefficient c, which also determines the maximum value of the torque converting ratio CR, depends in the first place on how many impulses are formed per each revolution made by the input shaft in regard to the middle shaft. The tests made with a prototype as per the variation shown in FIG. 1 with two necks which, by closing the orifice of the oil duct 8, cause a rise in pressure in the pressure space of the clutch and the forming of two impulses per each revolution made by the input shaft in regard to the middle shaft, gave the value c=9.5, when the maximum torque converting ratio was 1:10.5. This value is obtained experimentally by increasing the braking on the output shaft until it stops and the efficiency is in this moment nought. With the converting ratio 1:2 the efficiency was n=0.89 and the influence of the losses is provable therein that the gearing ratio was then 2.24:1.

The solution according to the variation shown in FIG. 1 is characterized thereby, that the rotating movement of the input shaft in regard to the middle shaft causes a momentary or continuous movement of oil from the suction space of the hydrostatic clutch into its pressure space in such a way that the pressure acting in the pressure space counteracts the motion between the parts of the clutch and thus the motion between the input shaft and the middle shaft. For this reason, the functioning mode of the clutch is determined by a valve, which controls the oil flow from the pressure space and in that way how high pressure acts in it. When the control valve is fully open, no pressure is formed and the device is in the neutral position and when the valve is fully closed, the device is on direct drive. Between these limit positions of the control valve, the device is forming impulses and functions as a torque converter when the torque converting ratio is determined by the control valve position and varies steplessly according to the loading on the whole performance and revolution speed range of the engine.

The device is on direct drive when a high enough base pressure is maintained in the pressure space of the clutch in regard to the loading level. The pressure can be obtained for instance with the help of an oil pump and a pressure limiting valve driven by the output shaft. The valve controls the base pressure in such a way that the device is kept on direct drive within the torque required at the driving with different level speeds and increased by a suitable reserve. In case the loading rises steeply, caused for instance by a steep uphill, the formation of the impulses begins automatically, which maintains the torque required by the loading on the ouput shaft whereat the revolution speed of the output shaft and the driving speed decrease. If, in this situation, the engine performance increases sufficiently, the revolution speed of the engine and the input shaft grows in regard to the revolution speed of the middle shaft to such an extent that the forming impulses transfer sufficient energy to the output shaft without a decrease of its revolution speed. In both cases, the device functions as a torque converter and steplessly.

The variation corresponding to manual transmissions is equipped with a valve group in which the main valve is manually controlled and when the engine is at idle running a valve, regardless of the control valve position, keeps the device in neutral position. The power transmission in the opposition direction is obtained with a one-way valve which prevents the return flow of oil from the suction space of the clutch to the oil sump of the device. When the middle shaft has a greater revolution speed than the input shaft, oil is transferred from the pressure space of the clutch to its suction space and since the one-way valve prevents the oil flow from the suction space, the pressure rises in it until the middle shaft rotates the input shaft and the engine. The engine braking functions then and the engine can be started for instance by towing the car. Particularly in connection with the manually controlled variation, there is reason to fit the device with a valve, which by limiting the maximum pressure in the pressure space of the clutch limits the maximum value of the generated torque and in that way prevents the mechanical straining of the power transmission components to be too hard. There is reason to fit the device also with a valve, the function of which is synchronized with the control valve, and when this is in the extreme closing position, it prevents the flow of oil from the pressure space of the clutch along other ducts except that, which is closed by the control valve and keeps the device continuously on direct drive irrespectively of the revolution speed and the loading of the engine. The engine is fitted with a revolution speed limiter.

The solution according to the invention is also extremely suitable for use on earth moving machines and similar equipment. For instance, the spring and hydrostatic clutch combination may be used for smoothly starting heavy machine units in the industry.

Concerning the functioning principle of the solution according to the invention, it may generally be established that when the input shaft rotates in regard to the middle shaft, the construction (the variation shown in FIG. 1) causes the transfer of oil from the suction space of the hydrostatic clutch to its pressure space and, when forming an impulse, the oil flows from the pressure space through the control valve only, which is throttling the flowing. As the influence of the pressure on oil density is insignificant, the pressure rises steeply in the pressure space of the clutch until it resists the oil moving into it, which stops the movement between the clutch components and in that way engages the input shaft and the middle shaft to each other. In other variations the movement of the piston in the cylinder causes a corresponding effect.

The torque, generated by the engine, turns the middle shaft in direction of the power transmission and increases the torsional force in the spring located between the middle shaft and the output shaft. The duration time of the impulse and the turning angle of the middle shaft during the impulse depend on the control valve position and on the torque level acting on the middle shaft and caused by the loading. The greater the torque, the higher the pressure peak in the clutch and the greater the flowing speed of oil through the control valve at the determined control valve position, which means a shorter duration time of the impulse and greater gearing and torque converting ratios.

BRIEF DESCRIPTION OF THE DRAWINGS

FIG. 2 illustrates the centre gear used in the converter of FIG. 1;

FIG. 3 illustrates a second variation of a torque converter in accordance with the present invention;

FIG. 4 illustrates a control valve for the torque converter(s) of the present invention;

DETAILED DESCRIPTION

Figure 1:
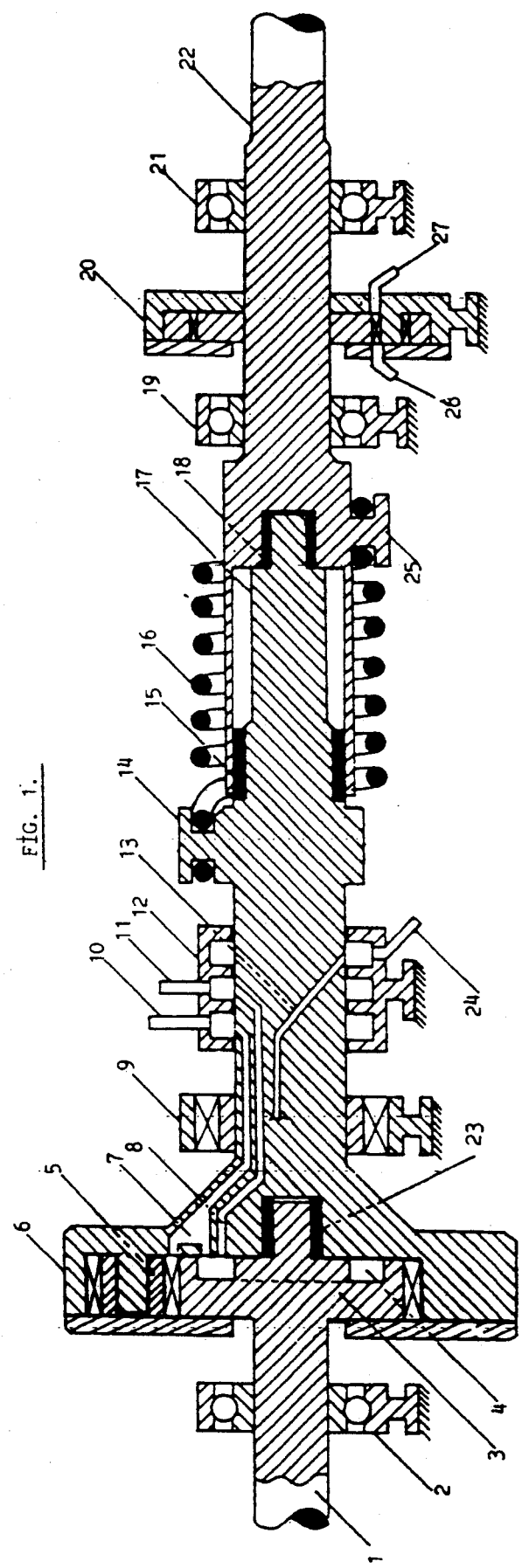
FIG. 1 illustrates a first variation of a torque converter in accordance w the present invention.

In the variation shown in FIG. 1, the parts 3, 5 and 6 form the hydrostatic clutch whose centre gear 3 is a part of the input shaft 1 and whose clutch housing 6 is a part of the middle shaft 17, which by means of the spring 16 rotates the output shaft 22. The one-way clutch 9 prevents the turning of the middle shaft 17 to the opposite direction in regard to power transmission. As shown in FIG. 2, in the centre gear 3 has been formed the groove 4 and the necks 28. The oil duct 7 opens as well to the pressure space of the clutch as to the groove 4 and links these to the connecting pipe 10. Oil duct 8 opens to groove 4 and links it to connecting pipe 11. Oil duct 13 links the connecting pipe 24 to the suction space of the clutch. When the centre gear is rotating in regard to clutch housing 6, the side gear 5 rotates in the opposite direction and the clutch sucks oil from the connecting pipe 24, which is linked to the oil sump of the device. The connecting pipe 10 is linked to the control valve 55 shown in FIG. 4 and from connecting pipe 53 the oil flows to the oil sump of the device.

When the centre gear rotates in regard to clutch housing 6 and the neck 28 reaches the orifices, where the oil ducts 7 and 8 open into the groove 4, the flow of oil from the pressure space to oil duct 8 is prevented and the oil flow takes place exclusively along oil duct 7 to connecting pipe 10 and further to the control valve 55. On the control valve position depends the flowing resistance and the pressure loss caused by it and, as a function of the difference in angle speed between the input shaft and the middle shaft, it determines how high pressure peak acts in the pressure space of the clutch during the impulse. The greater the angle speed difference and/or the torque, caused by the loading and acting on the middle shaft, the higher the pressure peak and greater the torque, which during the impulse turns the clutch housing 6 towards the power transmission. For realizing a fully automatic function, the output shaft 22 is equipped with oil pump 20, from which the oil flow leads to the connecting pipe 57 in the control valve 55 shown in FIG. 4. The oil pressure is determined by a pressure limiting valve, which is controlled by the revolution speed of the output shaft and in different driving conditions maintains a proper base pressure in the clutch.

Figure 6:
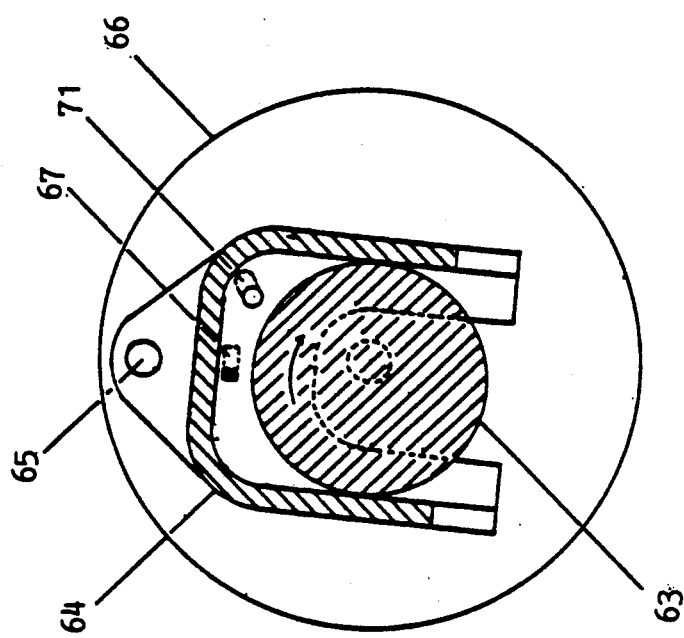
FIG. 6 a sectional view taken along lines 6—6 in FIG. 5.
Figure 5:
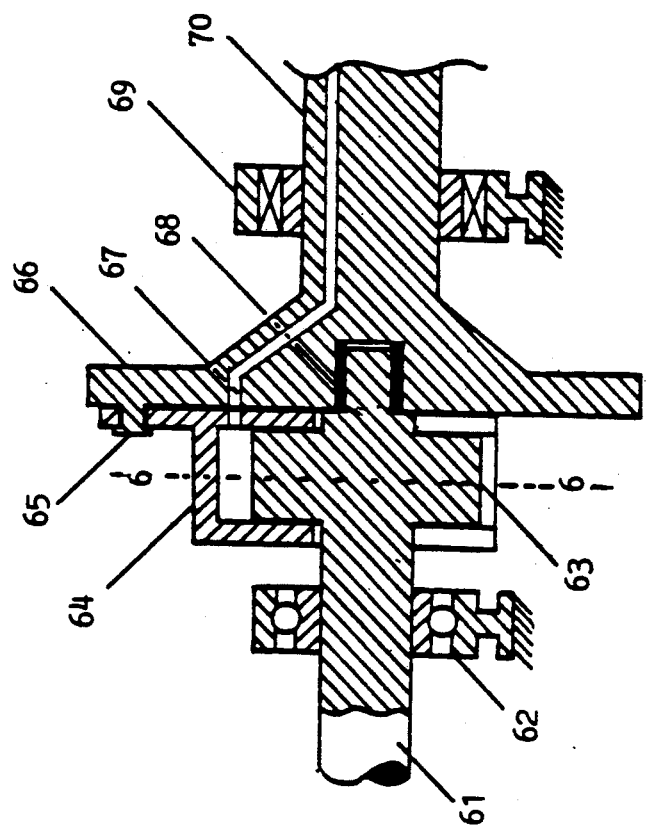
FIG. 5 illustrates a third variation of a torque converter in accordance w the present invention.

In the variation shown in FIG. 5, the hydrostatic clutch is formed by a disk-like piston 63, which is eccentric in regard to input shaft 61, a bottom plate 66 and the cylinder 64, which is in a pivoting way bearing-mounted in point 65. In the section taken along line 6—6 shown in FIG. 6 the orifice of the oil duct 71 is visible, which opens to the cylinder space 60 and is continuously open, as well as the orifice of the oil duct 67, which is closed in the extreme position of the cylinder 64. In this position are formed the impulses and the valve, in which the oil leads from the orifice of duct 71, controls the function of the device. In FIG. 3, is shown a variation, in which the movement of the piston 47 takes place in an axial direction. The sliding rods 41 and the rod guides 40 and 42 prevent the turning of the piston towards the input shaft 30. The impulse forms when the bulge in the piston meets the bulge 43 in middle shaft and the piston tends to move to the left in the figure. From the connecting pipe 34, oil leads to a valve which is controlling the function of the device. After the impulse, the spring 37 returns the piston to the initial position and oil flows in the pressure space 46 through the connecting pipe 32, which is linked to the oil sump of the device.

In all variations the pressure limiting valve, which is determining the maximum pressure level acting in the pressure space of the clutch, is linked for instance to the connecting pipe 57 shown in FIG. 4.

It is obvious that the invention is not limited to the aforementioned examples of application and that many other constructions can be put forward according to the following patent claims.

I claim:

1. A torque converting device which comprises:
    an input shaft driven by an engine;
    an output shaft for driving a load;
    a middle shaft intermediate said input and output shafts;
    clutch means for transferring energy quanti from said input shaft to said output shaft for a the form of a series of impulses wherein the number of impulses in time unit is proportional to the difference between the revolution speeds of the input shaft and the output shaft and a torque larger than the average torque generated by the engine acts on said output shaft; and
    said clutch means engaging and disengaging said input shaft to and from said middle shaft with the momentary or continuous torque being transferred being a function of the pressure level acting in a pressure space of the clutch and with the torque being converted by the device increasing or decreasing in the same proportion as the pressure level in the pressure space rises or drops.

2. Device according to claim 1 further characterized thereby in that per each revolution made by the input shaft with respect to the middle shaft there is at least one inter-shaft position in which the oil flow from the pressure space of the clutch means is prevented along ducts other than ducts for conducting oil to valves, whereby the pressure level prevailing in the pressure space of the clutch means is controlled by throttling the out-flowing of oil.

3. A device according to claim 1 wherein:
    said clutch means comprises a hydrostatic clutch having a housing located between the input shaft and the middle shaft, a center gear, a pressure space and a suction space;
    said housing forms part of a first one of said input and middle shafts;
    said center gear forms part of a second one of said input and middle shafts; and
    whereby the quantity of oil transferred from the suction space of the clutch to the pressure space is directly proportional to the difference of the angle speed between the input and middle shafts and the pressure level acting in the pressure space of the clutch is determined by throttling the oil flow leaving the pressure space.

4. Device according to claim 3 characterized thereby that the movement of the center gear of the hydrostatic clutch in regard to the clutch housing causes the transfer of oil from the suction space of the clutch to the pressure space and, when forming an impulse, the pressure due to it rises until it stops the movement between the clutch center gear and housing and generates a torque which turns the middle shaft in the direction of power transmission, whereby the turning angle of the middle shaft and the duration time of the impulse depend on the torque level caused by the loading and on the throttling of the oil out-flowing from the pressure space of the clutch.

5. Device according to claim 1 wherein said clutch means is formed by a piston and cylinder positioned between said input and middle shafts and that per each revolution made by the input shaft in regard to the middle shaft there is at least one inter-shaft position in which the device causes movement of said piston in said cylinder and increases the pressure in a pressure space of the cylinder, which retards the movement of the piston in regard to the cylinder and engages the shafts for the duration time of the impulse to each other and converts the torque which turns the middle shaft in the direction of the power transmission, whereby the turning angle of the middle shaft and the duration time of the impulse depend on the torque level caused by the loading and on the throttling of the out-flowing oil from the pressure space of the cylinder.

6. Device according to claim 1 characterized thereby that the device is equipped with a valve combination which at idle running of the engine allows a flow of oil from the pressure space of the clutch to prevent the forming of said impulses and keeps the device in neutral position, by preventing a reverse flow of oil from the clutch means to an oil sump of the device maintains the power transmission in opposition direction and by limiting the maximum pressure in the clutch means and thus the maximum value of the converted torque thereby preventing the mechanical overloading of the power transmission.

7. Device according to claim 1 characterized thereby that the clutch is equipped with a valve which is synchronized with a control valve, and when said control valve is in an extreme closing position, it prevents the flow of oil from the pressure space of the clutch along ducts except a duct which is closed by the control valve and it keeps the device continuously on a direct drive arrangement irrespective of the revolution speed and the loading of the engine.

8. A procedure for converting torque acting on a shaft, characterized by transferring energy quanti from an input shaft driven by an engine to an output shaft driving a load, said transferring step comprising transferring said energy quanti in the form of impulses, the number which for a time unit is proportional to the difference between the revolution speeds of the input shaft and the output shaft, to potential energy which in the form of a torsional force acting between a middle shaft positioned intermediate said input and output shafts and the output shaft maintains a greater torque than the average torque generated by the engine on said output shaft.

9. A procedure for converting torque acting on a shaft, characterized by:
transferring energy quanti from an input shaft driven by an engine to an output shaft driving a load, said transferring step comprising transferring said energy quanti in the form of impulses, the number which for a time unit is proportional to the difference between the revolution speeds of the input shaft and the output shaft, to potential energy which in the form of a torsional force acting between a middle shaft positioned intermediate said input and output shafts and the output shaft maintains a greater torque than the average torque generated by the engine on said output shaft;
repeatedly disengaging the input shaft driven by the engine from the middle shaft intermediate said input and output shafts when the motional speed of moving parts of the engine and the quantity of motional energy based thereon grows;
converting motional energy in impulse form into potential energy when the input shaft re-engages itself to the middle shaft; and
maintaining on the output shaft a torque required by the loading via a torsional force of a spring located between said middle and output shafts, the efficiency of said torque converter being a function of the converting ratio according to the following formula:

$$n = 1 - \frac{CR - 1}{c}$$

wherein n=efficiency
CR=converting ratio
c=coefficient, depending on the construction.

10. A procedure according to claim 9 further characterized thereby by engaging and disengaging the input shaft to and from the middle shaft with a hydrostatic clutch, whereby momentary or continuous torque transferred thereby is a function of the pressure level prevailing in a pressure space of the clutch and thus the torque converted increases or decreases in the same proportion as the pressure level in the pressure space rises or drops.

11. A procedure for converting torque acting on a shaft characterized by transferring energy quanti from an input shaft driven by an engine to an output shaft driving a load, said transferring step comprising transferring said energy quanti in the form of impulses, the number which for a time unit is proportional to the difference between the revolution speeds of the input shaft and the output shaft, into a torsional force which acting between a middle shaft positioned intermediate said input and output shafts and the output shaft maintains a greater torque then the average torque generated by the engine on said output shaft.

12. A procedure for converting torque acting on a shaft characterized by transferring energy quanti from an input shaft driven by an engine to an output shaft driving a load, said transferring step comprising transferring said energy quanti in the form of impulses, the number which for a time unit is proportional to a difference between the revolution speeds of the input shaft and the output shaft, to a torsional force by means of a spring acting between a middle shaft positioned intermediate said input and output shafts and the output shaft which maintains a greater torque then the average torque generated by the engine on said output shaft.

* * * * *

UNITED STATES PATENT AND TRADEMARK OFFICE
CERTIFICATE OF CORRECTION

PATENT NO. : 5,014,837
DATED : May 14, 1991
INVENTOR(S) : Kauko Kaari

It is certified that error appears in the above-identified patent and that said Letters Patent is hereby corrected as shown below:

IN COLUMN 4, LINE 33, DELETE "W" AND INSERT --WITH--.

IN COLUMN 4, LINE 41, DELETE "W" AND INSERT --WITH--.

IN COLUMN 5, CLAIM 1, LINE 62, DELETE "FOR A" AND INSERT --IN-- BETWEEN "SHAFT" AND "THE".

IN COLUMN 5, CLAIM 1, LINE 64, DELETE "IN" AND INSERT --FOR A--.

IN COLUMN 6, CLAIM 2, LINE 15, DELETE "PREVAILING" AND INSERT --ACTING--.

IN COLUMN 8, CLAIM 10, LINE 22, DELETE "PREVAILING" AND INSERT --ACTING--.

Signed and Sealed this

Twenty-fourth Day of November, 1992

Attest:

DOUGLAS B. COMER

Attesting Officer

Acting Commissioner of Patents and Trademarks